3,525,757
METHODS OF PREPARING 15,16β-METHYLENE-TESTOSTERONE AND ESTERS THEREOF
Otfried Schmidt, Friedmund Neumann, and Rudolf Wiechert, Berlin, Germany, assignors to Schering AG., Berlin, Germany
No Drawing. Filed Jan. 30, 1968, Ser. No. 701,547
Claims priority, application Germany, Feb. 9, 1967, Sch 40,192
Int. Cl. C07c 169/22
U.S. Cl. 260—397.4                                6 Claims

ABSTRACT OF THE DISCLOSURE 15,16β-methylene-testosterone and its esters of the formula

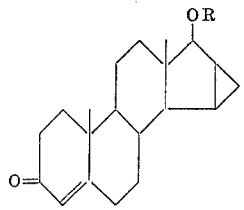

wherein R represents hydrogen or a physiologically tolerated acyl radical, are prepared by hydrogenating the corresponding 17-ketosteroid.

---

The invention relates to methods of preparing 15,16β-methylene-testosterone and its esters of the formula

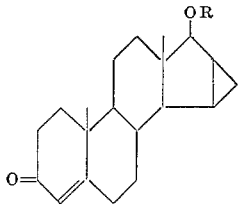

wherein R represents hydrogen or a physiologically tolerated acyl radical. The method of preparation is effected by any one of the following procedures:

(a) The corresponding 17-ketosteroid, in which the 3-keto group may be given intermediate protection, is hydrogenated and the keto group in 3-position, if also hydrogenated, is restored by oxidation, whereupon the hydroxyl group in position 17 may be esterified if so desired;

(b) A corresponding 17-ketosteroid of the partial formula

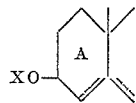

wherein

is a Δ⁴ or Δ⁵-double bond, and X is hydrogen, acyl, or tetrahydropyranyl, is hydrogenated in position 17, and the 3-hydroxy group is oxidized after removal of an acyl or tetrahydropyranyl radical, if present, and the 17-hydroxy group, if desired, may be acylated prior to removal of a tetrahydropyranyl radical or after oxidation of the 3-hydroxy group; or (c) A corresponding 17-ketosteroid of the partial formula

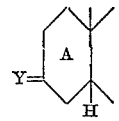

wherein Y is oxygen,

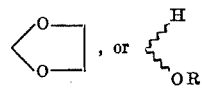

and R is hydrogen, acyl, or tetrahydropyranyl, is reacted according to methods (a) and (b), and a Δ⁴-double bond is introduced.

All acids commonly employed in steroid chemistry or their reactive derivatives are suitable partners for the esterification. The preferred acids are those having up to 15 carbon atoms, particularly low and medium aliphatic carboxylic acids. The acids may also be unsaturated, have branched carbon chains, be polybasic, or substituted in the usual manner, for example, by hydroxyl, amino, or halogen. The cycloaliphatic, aromatic, mixed aromatic-aliphatic and heterocyclic acids are also suitable and may be substituted. Examples of preferred acids are acetic acid, propionic acid, caproic acid, enanthic acid, undecylenic acid, trimethylacetic acid, monochloroacetic acid, dichloroacetic acid, cyclopentylpropionic acid, phenylacetic acid, phenoxyacetic acid, dialkyl-aminoacetic acid, piperidineacetic acid, succinic acid, benzoic acid, etc., also the usual inorganic acids, such as phosphoric and sulfuric acid.

The novel compounds are prepared by hydrogenating the keto group in position 17 of 15,16β-methylene-17-ketosteroids prepared according to the method of copending application Ser. No. 626,426, filed on Mar. 28, 1967, now U.S. Pat. No. 3,470,160, and by subsequent esterification of the 17-ol so produced, if desired. The hydrogenation may be performed according to methods known in the art. Reactions with mixed metal hydrides, such as lithium aluminum hydride, lithium tri-tert-butoxy-aluminum hydride, and sodium borohydride are specifically contemplated.

Suitable starting materials include, for example, 15,16β-methylene-17-ketosteroids which already contain the desired Δ⁴-3-keto structure in the A-ring.

Depending on the nature of the hydrogenation agent employed, an unprotected 3-ketone may be partially reduced during hydrogenation and has to be oxidized back thereafter. It may therefore be advisable to protect the keto group in position 3 prior to hydrogenation by the formation of a ketal, an enamine, an enol ether, or an enol ester.

It is also possible, of course, to introduce the ultimately desired Δ⁴-3-keto group into the A ring only after the hydrogenation of the keto group in position 17.

One may thus first hydrogenate the 17-keto group of the 15,16β - methylene-Δ⁵-androstene-3-ol-17-one-3-tetrahydropyranyl ether, esterify the 17β-hydroxyl group so formed, split the tetrahydropyranyl ether in position 3 by hydrolysis, and oxidize the 15,16β-methylene-Δ⁵-androstene-3β-17β-diol-17-ester in position 3 according to Oppenauer's method. The sequence of reactions is illustrated by the following formulas:

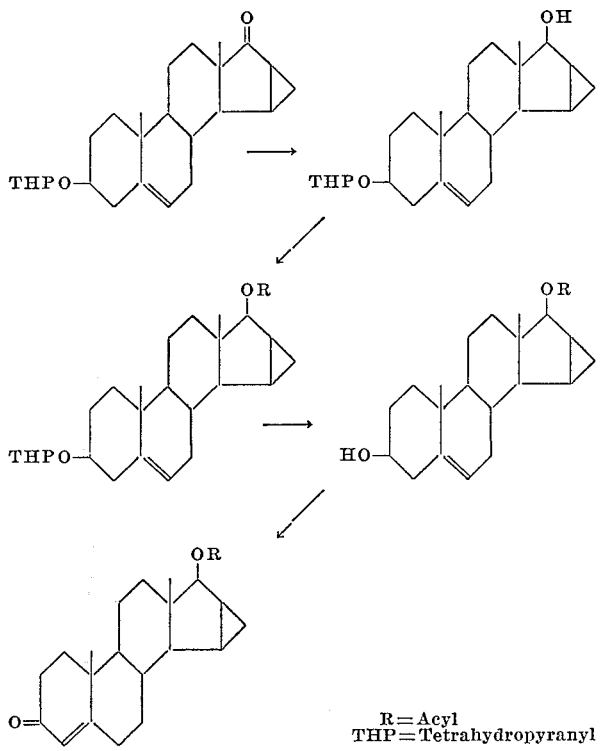

Another approach leads from 15,16β-methylene-5β-androstane-3,17-dione-3 - ethyleneketal by hydrogenating the 17-keto group, splitting of the 3-ethyleneketal, optional esterification of the 17-hydroxy group, and introduction of a Δ⁴-double bond to the 15,16β-methylene-testosterone. The reactions occur according to the following formulas:

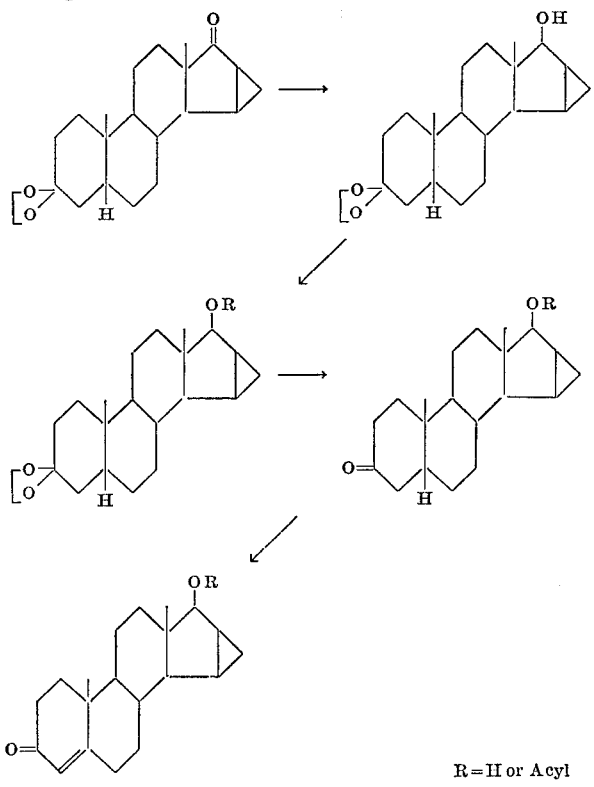

The Δ⁴-double bond is introduced in a manner known, for example, by chemical or microbial dehydrogenation or by bromination followed by removal of hydrogen bromide.

The compounds prepared according to the invention herein are distinguished by their surprisingly strong androgenic activity which exceeds even that of the testosterone propionate. Moreover, the products of the method also have strong anabolic activity.

The new 15,16β-methylene steroids are compounded for therapeutic use with addition agents, carriers, and taste improving agents commonly employed in galenic pharmacy according to known methods to prepare the types of pharmaceuticals conventional in the trade. Oily solutions, for example, sesame oil or castor oil, are suitable for parenteral application. The oily solutions may additionally contain a diluent, such as benzyl benzoate or benzyl alcohol. Tablets, sugar-coated tablets, capsules, pills (suspensions, or solutions may be used particularly for oral application. The concentration of the active agent in the therapeutic compositions so formulated depends, of course, also on the form of application. Thus, the oily solutions contains preferably 1–100 mg. active substance per 1 ml., and the orally applied therapeutic compositions contain preferably 0.5–20 mg. per 1–1.5 g. of finished therapeutic composition.

The new therapeutic compositions according to the invention, because of their surprisingly high androgenic activity, may be employed to advantage in all diseases which are known to require androgen therapy, such as for the treatment of male climactery, for treatment of disorders of the peripheral circulatory system, cardiac insufficiency, protein deficiency in infectious diseases, cirrhosis of the liver, osteoporosis, delayed healing of fractures, etc.

The products covered by the present invention have been found efficacious for the treatment of illness in human beings.

Initial clinical tests show that patients suffering from endogenous androgen deficiency are given 1–30 mg. daily, and preferably 10–20 mg. of 15,16β-methylene-Δ⁴-androstene-17-ol-3-one-17-propionate in oily solution by intramuscular injection. The treatment is continued for four weeks, and the volume of ejaculate and the fructose concentration in the sperm are returned to normal thereby. It is also noted that tiredness and circulatory disturbances are alleviated.

The strong androgen activity of the 15,16β-methylene-testosterones is unobvious because the corresponding 19-nortestosterones as set forth in copending application 626,427 now U.S. Pat. No. 3,469,008 combine a strong anabolic effect with very weak androgen effects.

The 15,16β-methylenesteroids appear to be preferable in many cases because they have high anabolic activity aside from the aforementioned high androgenic activity.

The following examples are illustrative but not restrictive of the method of preparing compounds according to the invention herein.

EXAMPLE 1

Water is removed by azeotropic distillation from solutions of 3 g. 15,16β-methylene-Δ⁵-androstene-3β-ol-17-one, prepared from Δ⁵,¹⁵-androstadiene-3β-ol-17-one by methylenation with dimethylmethylene-sulfonium oxide, in 150 ml. benzene, and of 100 mg. p-toluenesulfonic acid in 20 ml. benzene respectively. The solutions are permitted to cool, whereupon they are combined, and stirred for 24 hours after the addition of 20 ml. dihydropyran. The p-toluenesulfonic acid is then neutralized by the addition of sodium bicarbonate, the mixture is washed with water until neutral and dried, and 3.8 g. 15,16β-methylene-Δ⁵-androstene-3β-ol-17-one - 3 - tetrahydropyranyl ether are obtained after evaporation.

3.7 g. 15,16β-methylene-Δ⁵-androstene-3β-ol-17-one-3-tetrahydropyranyl ether are dissolved in 200 ml. tetrahydrofuran, 760 mg. LiAlH₄ are added with stirring; stirring being continued for an hour, and excess hydrogenating agent is destroyed by adding ethyl acetate. The reaction mixture is diluted with ether, extracted repeatedly with potassium hydroxide, washed neutral with water, dried, and the solvent is evaporated. 3.6 g. 15,16β-methylene - Δ⁵ - androstene - 3β - 17β - diol - 3 - tetrahydropyranyl ether are obtained which are dissolved in a mixture of 20 ml. pyridine and 8 ml. propionic anhydride and left to stand overnight. Ice water is added for precipitating a crude product which is dissolved in 250 ml. ethanol and 10 ml. water, and heated ½ hour with stirring on a steam bath after adding 3 ml. concentrated hydrochloric acid. A crude product is precipitated by the addition of ice water and purified by chromatography on silica gel. As a result, 2.6 g. 15,16β-methylene-Δ⁵-androstene-3β,17β-diol-17-propionate are obtained.

2.6 g. 15,16β - methylene-Δ⁵-androstene-3β,17β-diol-17-propionate are dissolved in 20 ml. toluene and 2.5 ml. cyclohexanone, 5 ml. toluene are thereafter distilled off and 0.13 g. aluminium isopropylate in 2 ml. toluene are added. The mixture is heated to a boil for 30 minutes, cooled to room temperature, extracted with 1% sulfuric acid and thereafter with 0.5% soda ash solution, and washed neutral with water. The residue remaining after drying and evaporation of the solvent is purified by chromatography on silica gel. There are obtained 1.85 g. 15,16β-methylene-Δ⁴-androstene - 17β - ol - 3 - one-17-propionate of M.P. 132.5–134° C.

EXAMPLE 2

1 g. 15,16β-methylene-Δ⁴-androstene-17β-ol-3-one is diethyleneketal (prepared from Δ¹⁵-5β-androstene-3,17-dione-3-ethyleneketal by methylenation with dimethylmethylenesulfonium oxide); (M.P. 191–193° C.) are hydrogenated in tetrahydrofuran solution with an excess of lithium aluminum hydride for 1 hour at room temperature. The crude product obtained (12 g.) is dissolved in 160 ml. methanol and 25 ml. water, and is heated to a boil after the addition of 12 g. oxalic acid. After precipitation with ice water, the crude material is recrystallized from diisopropyl ether. As a result, 9.52 g. 15,16β-methylene-5β-androstane-17β-ol-3-one of melting point 129–130.5° C. are obtained.

3.78 g. pyridinium bromide perbromide (92.5%) are added to 3.02 g. 15,16β-methylene-5β-androstane-17β-ol-3-one, and the mixture is stirred for 15 minutes. The resultant product isolated by precipitation with ice water is carefully dried, dissolved in 100 ml. dimethylformamide, and stirred for 15 hours under nitrogen at 100° C. after addition of 5 g. lithium carbonate and 2.5 g. lithium bromide. The inorganic salts are filtered off with suction, and the filtrate is mixed with ice water. The precipitate is purified by chromatography on silica gel. There are obtained 1.62 g. 15,16β-methylene-Δ⁴-androstene-17β-ol-3-one of melting point 157–158° C.

EXAMPLE 3

1 g. 15,16β-methylene-Δ⁴-androstene-17β-ol-3-one is dissolved in 5 ml. pyridin and 2.5 ml. acetic anhydride, and the mixture is left to stand overnight at room temperature. 1.1 g. of a crude product are precipitated by ice water and purified by recrystallization from diisopropyl-ether. There are obtained 860 mg. 15,16β-methylene - Δ⁴ - androstene-17β-ol-3-one-17-acetate of melting point 134–135° C.

EXAMPLE 4

1 g. 15,16β - methylene-Δ⁴-androstene-17β-ol-3-one is dissolved in a mixture of 5 ml. pyridine and 2 ml. propionic anhydride and stirred overnight at room temperature. The precipitate obtained by the addition of ice water is recrystallized from diisopropyl ether. 910 mg. 15,16β-methylene - Δ⁴ - androstene-17β-ol-3-one-17-propionate of melting point 132–133.5° C. are obtained.

EXAMPLE 5

5 g. 15,16β-methylene-Δ⁴-androstene-17β-ol-3-one are heated in 20 ml. absolute pyridine with 10 ml. enanthic anhydride for 2 hours to 125° C., whereupon 0.4 ml. water are added, and the mixture is heated for one hour to 100° C. Pyridine and an excess of enanthic anhydride are then distilled off with steam. The reaction product is extracted with methylene chloride, and the methylene chloride phase is dried over sodium sulfate and evaporated. 4.3 g. 15,16β-methylene-Δ⁴-androstene-17β-ol-3-one-17-enanthate are obtained as an oil.

From the foregoing it will be noted that we have provided testosterones and methods thereof effective in the treatment of certain ailments of the human body.

We claim:
1. A testosterone compound of the formula

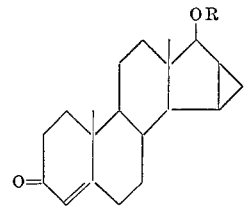

wherein R is a physiologically tolerated acyl radical having 1 to 15 carbon atoms.

2. A 15,16β-methylene-testosterone compound having the generic formula set forth in claim 1 and selected from the group consisting of 15,16β-methylene-Δ⁴-androstene-17β-ol-3-one; 15,16β-methylene-Δ⁴-androstene-17β-ol-3-one-17 acetate; 15,16β-methylene-Δ⁴-androstene-17β-ol-3-one-17 propionate and 15,16β-methylene-Δ⁴-androstene-17β-ol-3-one-17 enanthate.

3. 15,16β-methylene-Δ⁴-androstene-17β-ol-3-one.
4. 15,16β - methylene - Δ⁴-androstene-17β-ol-3-one-17-acetate.
5. 15,16β - methylene - Δ⁴-androstene-17β-ol-3-one-17-propionate.
6. 15,16β - methylene - Δ⁴-androstene-17β-ol-3-one-17-enanthate.

References Cited
UNITED STATES PATENTS 3,338,928  8/1967  Beard et al.
3,438,975  4/1969  Edwards.

HENRY A. FRENCH, Primary Examiner

U.S. Cl. X.R.

260—239.5, 239.55, 397.5